United States Patent
Yakay et al.

(10) Patent No.: US 9,041,813 B1
(45) Date of Patent: May 26, 2015

(54) MULTIPLE CAMERA SYNCHRONIZATION SYSTEM

(71) Applicant: Maxim Integrated Products, Inc., San Jose, CA (US)

(72) Inventors: Levent Yakay, Istanbul (TR); Can Bilgin, Istanbul (TR); Arda K. Bafra, Istanbul (TR); Mustafa E. Oner, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/328,816

(22) Filed: Jul. 11, 2014

Related U.S. Application Data (60) Provisional application No. 61/940,133, filed on Feb. 14, 2014.

(51) Int. Cl.
*H04N 7/18* (2006.01)
*H04N 5/073* (2006.01)
*H04N 5/247* (2006.01)

(52) U.S. Cl.
CPC ............... *H04N 5/073* (2013.01); *H04N 5/247* (2013.01)

(58) Field of Classification Search
USPC .................. 348/513, 159, 143, 153, 154, 156
See application file for complete search history.

(56) References Cited

U.S. PATENT DOCUMENTS

| 7,486,308 B1 * | 2/2009 | Kori et al. ..................... 348/143 |
| 7,576,770 B2 * | 8/2009 | Metzger et al. ............... 348/143 |
| 2014/0022391 A1 * | 1/2014 | Naik et al. ..................... 348/159 |

* cited by examiner

*Primary Examiner* — Michael Lee
(74) *Attorney, Agent, or Firm* — Advent, LLP (57) ABSTRACT

A system for at least substantially plesiochronously operating a receiver in communication with a plurality of cameras (e.g., at least two plesiochronously operational cameras) is described. In one or more implementations, the system includes a plurality of cameras. Each camera is configured to generate a signal for transmission via a communications link, and the signal comprises data packets encoded in a forward channel. The system also includes a receiver communicatively coupled to the plurality of cameras via the single-ended communications link. The receiver is configured to generate a synchronization data based upon at least one of the data packets. The receiver is also configured to modulate the signal to encode the synchronization data in a reverse channel so that the signal comprises the forward channel data and the reverse channel data simultaneously.

12 Claims, 6 Drawing Sheets

MULTIPLE CAMERA SYNCHRONIZATION SYSTEM

BACKGROUND

In many applications, high speed data is transferred from a source (e.g., a camera) to a sink (e.g., a receiver) substantially simultaneously with the transfer of low speed data in both directions. For example, in video applications, video data (e.g., relatively high speed data) is transferred from a video source (e.g., a camera) to a video sink (e.g., a display). Simultaneously with the transfer of the video data, control data (e.g., relatively low speed data) may be transferred, in both directions, between the video source and the video sink. For example, control data from the video source to the video sink may dictate how the video data is to be displayed. While, for example, control data from the video sink to the video source may dictate the view angle, exposure, focus of the camera, or status of video device. The high speed and the low speed data is typically transmitted via physical cables.

SUMMARY

A multiple camera synchronization system for at least substantially plesiochronously operating a receiver in communication with a plurality of cameras (e.g., at least two plesiochronously operating cameras) is described. In one or more implementations, the system includes a plurality of cameras. Each camera is configured to generate a signal for transmission via a communications link, and the signal from each camera comprises data packets encoded in a forward channel. The system also includes a receiver communicatively coupled to the plurality of cameras via the communications link. The receiver is configured to generate synchronization data based upon the data packets. The receiver is also configured to modulate the signal to encode the synchronization data in a reverse channel so that the signal comprises the forward channel data and the reverse channel data simultaneously.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Some applications like surround view in an automotive vehicle requires synchronization of four (4) to six (6), or more cameras, so that individual video streams can be combined and processed without requiring excessive memory. Cameras can be at physically separated locations and the system may need to operate plesiochronously. Variations in physical data transmission mediums used to carry video and control (synchronization) data, variations in the cameras and receivers, as well as deviations in individual camera local clock frequencies contribute to dynamic skew on the receiver side that may require processing and compensating by the processor (e.g., microcontroller) and software. Delays due to software overhead may add further to the minimum skew that can be compensated, which results in large memory requirements for video buffering. If cameras are not synchronized, the start frame from each camera may have almost one frame difference, which may require a full frame of memory to deskew to achieve synchronization.

Therefore, a system for at least substantially plesiochronously operating a receiver in communication with a plurality of plesiochronously operating cameras is described. In one or more implementations, the system includes a plurality of cameras. Each camera is configured to generate a signal for transmission via a communications link, and the signal comprises data packets encoded in a forward channel, as well as the control data. The system also includes a receiver communicatively coupled to the plurality of cameras via the communications link. The receiver is configured to generate a synchronization data based upon at least one of the data packets. The receiver is also configured to modulate the signal to encode the synchronization data in a reverse channel so that the signal comprises the forward channel data and the reverse channel data simultaneously.

The system, as described herein in greater detail, may be scalable. Thus, in some implementations, multiple receivers may be connected together. In these implementations, one of the receivers may operate in a first mode of operation (e.g., master mode) while the other receivers operate in a second mode of operation (e.g., slave mode). In this configuration, the receiver operating in the first mode of operation determines and generates the synchronization data, which is transmitted to the receivers in the second mode of operation.

The system may enable low skew synchronization through the transmission of synchronization data. The synchronization data may comprise frame synchronization pulse data or frame start synchronization data. The system may also realize that one or more fixed skew components may be offset and compensated within the receiver.

Example Implementations

Figure 1:
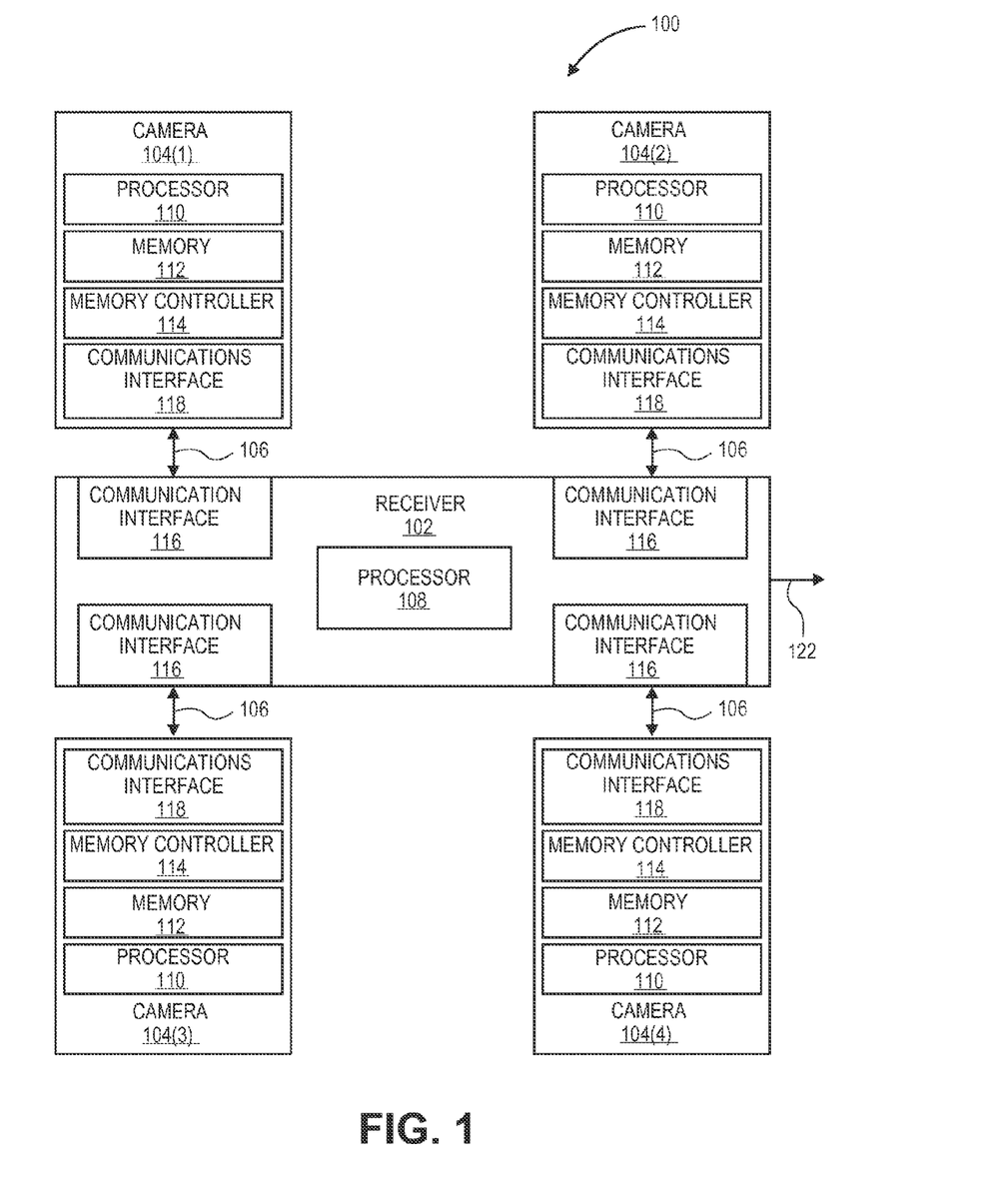
FIG. 1 is a block diagram illustrating a system for transferring data in accordance with an example implementation of the disclosure.

FIG. 1 illustrates a block diagram of an example system 100 for transferring data in accordance with an example implementation of the disclosure. In summary, the system 100 employs a data transmission technique for providing a full-duplex single-ended serial data link. In particular, the data transmission technique entails transmitting high speed data (e.g., video data) and low speed data (e.g., audio and/or control data) in a forward channel simultaneously with the transmission of low speed data (e.g., control data) in a reverse channel. Additionally, the full-duplex transmission of the data may occur over an inexpensive physical medium, such as a single coaxial cable, a printed circuit board (PCB) trace, or the like.

As shown in FIG. 1, the system 100 includes a receiver 102 and cameras 104 (e.g., cameras 104(1) through 104(4)) that are communicatively coupled to the receiver 102. Only four (4) cameras are illustrated for explanation purposes. However, it is understood that the system 100 may employ more or less cameras depending on the configuration of the system 100. In one or more implementations, the receiver 102 comprises an integrated circuit chip device. The cameras 104(1) through 104(4) are each communicatively coupled to the receiver 102 through a respective full-duplex serial data link 106. In a specific implementation, the data link 106 may be full-duplex single-ended serial data link. In another specific implementation, the data link 106 may be full-duplex differential serial data link. In one or more implementations, the cameras 104(1) through 104(4) may be deployed in different locations within a vehicle. For example, the cameras 104 may be configured to capture video data from various perspectives of the vehicle. The cameras 104(1) through 104(4) may each generate high speed data (e.g., parallel high speed data, CSI-2 data, etc.) that is provided through the respective data link 106 to the receiver 102. The cameras 104 are also configured to generate parallel, forward low speed data. In an implementation, the forward low speed data may comprise control associated with the high speed data. As described in greater detail herein, the cameras 104 are configured to receive reverse channel low speed data through an integrated communication interface (e.g., integrated serializer). In some implementations, the reverse channel low speed data comprises synchronization data that is utilized by the camera 104 to transmit the video data such that the video data is at least substantially synchronized with the corresponding video data transmitted from the other cameras 104. The receiver 102 is configured to determine (e.g., measure) a skew between video data of respective cameras 104. For example, the receiver 102 may determine a skew value by measuring corresponding VSYNCH signals with one another. Based upon the skew value, the receiver 102 transmits a synchronization signal to the cameras 104 such that the cameras 104 transmit video data based upon the skew value. As used herein, the frame duration of the data packets may refer to how many clock cycles elapse for the receiver 102 to receive the data packet.

The term "high speed data" means that it is transmitted at a higher rate (e.g., higher frequency) than the "low speed data." For example, the high speed data may be video data, audio data, and/or forward control data (e.g., synchronization data). Whereas, the low speed data may be control data. It shall be understood that "high speed data" need not be limited to video, and may encompass other types of data. Similarly, the "low speed data" need not be limited to control and may encompass other types of data.

In one or more implementations, the full-duplex serial data link 106 comprises a single communication link. For example, the single communication link may be a single coaxial cable, a single PCB trace, a single wire, or the like. In one or more implementations, the full-duplex serial data link comprises a full-duplex differential serial data link. The cameras 104(1) through 104(4) are configured to generate video data packets that are provided to the receiver 102 through the data link 106.

As shown in FIG. 1, the receiver 102 and the cameras 104 include a respective processor 108, 110 that is configured to provide processing functionality for the receiver 102 and the cameras 104. The processors 108, 110 and may include any number of processors, micro-controllers, or other processing systems, and resident or external memory for storing data and other information accessed or generated by the receiver 102 or cameras 104. The processors 108, 110 may execute one or more software programs which implement techniques described herein. The processors 108, 110 is not limited by the materials from which it is formed or the processing mechanisms employed therein and, as such, may be implemented via semiconductor(s) and/or transistors (e.g., electronic integrated circuits (ICs)), and so forth. In a specific implementation, the processor 110 is configured to adjust synchronization of video data being transmitted by the respective camera 102 based upon synchronization data transmitted in the reverse direction. For example, as described herein, the receiver 102 is configured to dynamically determine a skew value and cause transmission of synchronization data based upon the skew value, and the cameras 104 utilize the synchronization data to adjust the frame timing of the video data.

The cameras 104 may include memory 112 that is configured to store data associated with the respective camera 104. For example, the memory 112 may be configured to buffer high speed data and/or low speed data generated by the cameras 104. In an implementation, the memory 112 is operatively connected to a memory controller 114 that controls storage and/or buffering of the data. As shown in FIG. 1, each camera 104 includes a respective communication interface 116 that is communicatively connected with a corresponding communication interface 118 within the receiver 102 via the full-duplex serial data link 106. The communication interfaces 116, 118 include integrated control channel support. For example, the communication interface architecture described in U.S. patent Ser. No. 13/271,628, entitled FULL-DUPLEX SINGLE-ENDED SERIAL LINK COMMUNICATIONS SYSTEM, may be utilized for communication interfaces 116, 118. U.S. patent Ser. No. 13/271,628 is herein incorporated by reference. In another example, the communication interface architecture described in U.S. patent Ser. No. 12/545,744, entitled SYSTEM AND METHOD FOR TRANSFERRING DATA OVER FULL-DUPLEX DIFFERENTIAL SERIAL LINK, may be utilized for communication interfaces 116, 118. U.S. patent Ser. Nos. 12/545,744 and 13/271,628 are herein incorporated by reference. The communication interface 116 is configured to convert the serial data to data in a suitable format (e.g., parallel data) for the receiver 102. For example, the communication interface 116 is configured to convert the serial high speed data to high speed data (e.g., parallel high speed data) received via the data link 106. In another example, the communication interface 116 is configured to convert the serial low speed data to low speed data (e.g., parallel low speed data) received via the data link 106. Additionally, the communication interface is also configured to convert parallel reverse channel low speed data to serial reverse channel low speed data for transmission via the data link 106.

The communication interface 118 is configured to convert the data generated by a camera (e.g., parallel data) to serial data. For example, the communication interface 118 is configured to convert the high speed data to serial high speed data for transmission via the data link 106. In another example, the communication interface 118 is configured to convert the parallel low speed data to serial low speed data for transmission via the data link 106. Additionally, the communication interface is also configured to convert serial reverse channel low speed data to parallel reverse channel low speed data.

As described above, the cameras 104 may be deployed at different physical locations within a vehicle. In some instances, the data link 106 between each respective camera 104 may be different, which may result in a skew (e.g., a difference in arrival time of simultaneously transmitted data bits). However, it is understood that skew may occur for other reasons (e.g., system architecture, etc.). In one or more implementations, the cameras 104 transmit high speed forward data (e.g., video data packets) representing one or more video frames to the receiver 102, as well as forward low speed data. The cameras 104 receive reverse data from the receiver 102, and the cameras 104 are configured to transmit the forward high speed data based upon the reverse data. For example, the reverse data comprises synchronization data generated by the receiver 102.

In an implementation, during operation of the system 100, the cameras 104 generate video data representing an environment captured by a camera 104. The memory controller 114 causes storage (e.g., buffering) of the video data in the sensor's 104 memory 112. As described above, the cameras 104 transmit the video data (e.g., the forward high speed data) and the control data (e.g., the forward low speed data) to the receiver 102. The processor 108 (e.g., video processing unit) of the receiver 102 processes and/or re-formats the parallel video data and/or the parallel control data received from each of the cameras 104 and outputs the processed video data. For example, the processor 108 outputs the processed video data through an input/output (I/O) channel 122, which may provide the video data to a display for displaying the video frames transmitted by the cameras 104. In a specific implementation, the I/O channel 122 may be a CSI-2 output channel. In another specific implementation, the I/O channel 122 may be an HDMI output channel. However, the video data may be skewed with respect to the video data transmitted from the other cameras 104. For example, the receiver 102 is configured to stitch the data received from the respective cameras 102 together. However, if the data is not properly synchronized, the stitched data may not be properly time aligned.

The system 100 is configured to operate at least substantially plesiochronously. In an implementation, each camera 104 generates control data that comprises frame and/or line synch data (e.g., VSYNCH, HSYNCH) that is transmitted to the receiver 102. The processor 108 is configured to determine whether a packet of high speed data from a first camera 104 is skewed with respect to a corresponding packet of high speed data from a second camera 104 based upon the respective control data from the two cameras 104. In an implementation, the processor 108 calculates a skew value for each camera 104 based upon the received control data (e.g., corresponding VSYNCH data). The processor 108 then generates a synchronization data, and the synchronization data is transmitted as reverse low speed data to one or more cameras 104. The processor 110 of a respective camera 104 utilizes the synchronization data to determine a packet of high speed data (e.g., determine which packet of high speed data) to transmit to the receiver 102 to minimize skew between video data packets within the system 100. Each camera 104 transmits data representing video frames and the corresponding control data via the forward channel to the receiver 102. In a specific implementation, the processor 108 calculates a skew value for each video frame (e.g., the high speed data representing a video frame) transmitted from each camera 104. As described above, the processor 108 of the receiver 102 processes and/or re-formats the data representing the video frames. The receiver then transmits data representing the processed video frames via the I/O channel 102 such that a display may display synchronized video frames captured from each camera 104.

Figure 2A:
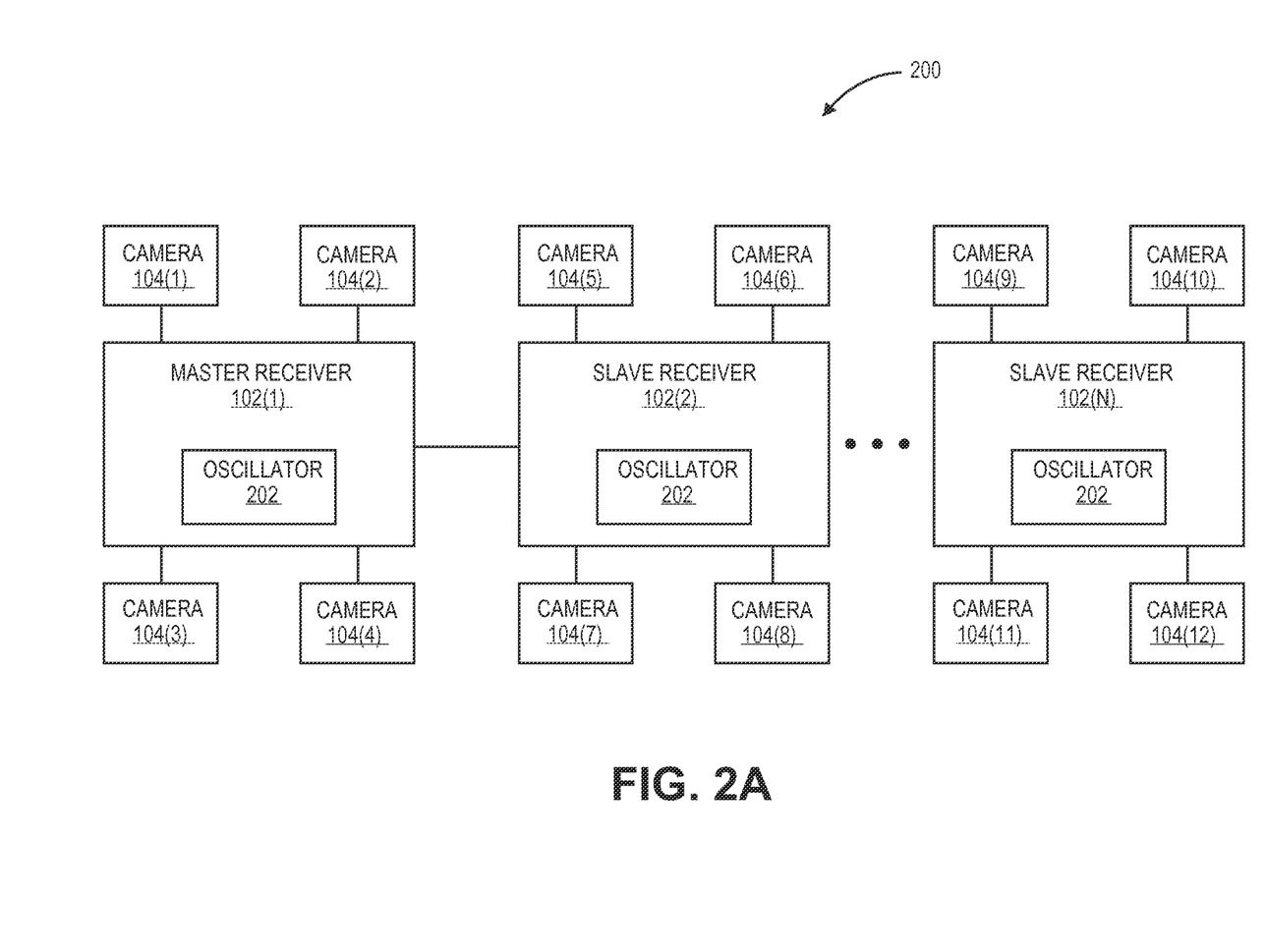
FIG. 2A is a block diagram illustrating a system for transferring data in accordance with another example implementation of the disclosure.
Figure 2B:
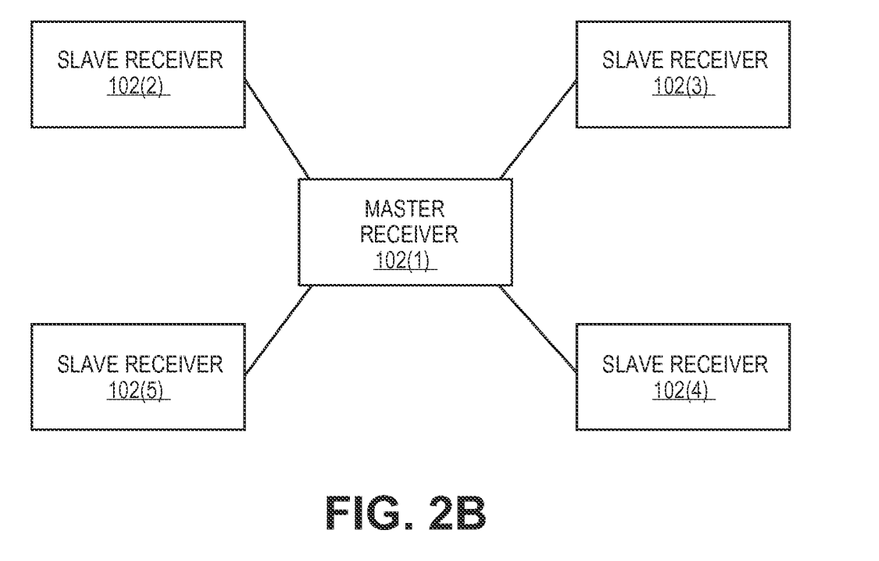
FIG. 2B is a block diagram illustrating a system for transferring data in accordance with another example implementation of the disclosure.

As shown in FIG. 2A, system 200 may include multiple receivers 102 (e.g., receivers 102(1) through 102(N)) communicatively connected with one another allowing for a scalable architecture. In these implementations, one receiver 102 may function in a first mode of operation (e.g. master mode) and the other receivers 102 may function in a second mode of operation (e.g., slave mode). During the first mode of operation, a receiver 102 transmits (e.g., relays, broadcasts, etc.) the synchronization data to the other receivers 102 that are functioning in the second mode of operation. The processor 108 of the receiver 102 functioning in the master mode of operation is configured to generate the synchronization data, which is transmitted to the receivers functioning in the slave mode of operation. For example, this processor 108 of the master receiver 102(1) may generate the synchronization data based upon a skew value as determined by the processor 108 utilizing the control data from the cameras 104 directly connected to the receiver 102 operating in the master mode of operation. The receiver 102 operating in the master mode determines the skew based upon the cameras 104 connected to the master receiver 102 and transmits synchronization data to the slave receivers 102. FIG. 2B illustrates another example implementation of the system 200. For example, the system 200 may be arranged in a star configuration. In this implementation, the master receiver 102 transmits the synchronization signal to the slave receivers 102.

In a specific implementation, the processor 108 determines a skew value corresponding to the video data transmitted from respective cameras 104 based upon the control data received from the respective cameras 104. The processor 108 generates a synchronization data based upon the skew value (e.g., synchronization data, a frame synch pulse signal, a frame start signal) that is broadcast to the respective cameras 104 within the system 200 as reverse channel low speed data. In some instances, the processor 108 is configured to determine a maximum skew value. The maximum skew value may comprise the maximum skew associated with a camera 104 within the system 100 and/or the system 200 (e.g., the video data packets having the longest delay from the camera 104 to the receiver 102). In these instances, the processor 108 generates a synchronization data based upon the maximum skew value that is transmitted to the cameras 104. The synchronization data may indicate which video packet to transmit from each camera 104 such that the video images from the cameras 104 are synchronized when displayed.

In one or more implementations, each receiver 102 may include an internal oscillator 202 to generate a repetitive, oscillating electronic signal utilized by the receiver 102 as a clock signal. When a receiver 102 is operating in the master mode of operation, the processor 108 utilizes the clock signal as a base for synchronization communication (e.g., utilizes the clock signal as a base when transmitting the synchronization data) to the receivers 102 operating in the slave mode of operation and/or cameras 104 in communication with the receiver 102 operating in the first mode of operation. In these instances, the receivers 102 operating in the slave mode of operation may utilize the respective receivers' 102 internal clock signal such that the respective processor 108 can generate internal synchronization signals.

In other implementations, the receivers 102 may receive a clock signal from an external source via the input channel 204. In these implementations, each receiver 102 may receive a synchronization pulse from the same external source (e.g., microcontroller, external system on a chip, etc.).

The system 100 and/or the system 200 may achieve at least substantial synchronization in various modes. For example, the system 100 and/or the system 200 may achieve at least substantial synchronization in automatic mode, semi-automatic mode, or manual mode.

In the automatic mode, the receiver 102 of the system 100 or the system 200 generates and transmits synchronization data to the cameras 104 at defined time intervals. For example, the processor 108 transmits synchronization data at defined internally counted frame duration that corresponds to an amount of expected latency within the communication channel (e.g., latency associated with receiver 102 and/or camera 104 circuitry). The processor 108 may determine an internally counted frame duration by determining the frame duration associated with each camera 104. Thus, in this implementation, the receiver 104 transmits synchronization data to the cameras 104 within defined time windows that are dictated by one or more of the cameras 104 such that the receiver 104 can receiver video data with minimal image corruption. In some instances, the processor 108 continually determines latency within the communication channel. For example, the processor 108 may continually determine latency by measuring the frame duration associated with the cameras 104. The processor 108 can automatically, or dynamically, adjust the internally counted frame duration, which adjusts transmission of the synchronization data.

In the semi-automatic mode, the processor 108 determines the frame durations associated with each camera 102 and selects the longest frame duration from these frame durations. In an implementation, the processor 108 may cause transmission of the synchronization data at time intervals corresponding to the selected frame duration. In other implementations, the processor 108 receives a selection identifying when the processor 108 is to cause transmission of the synchronization data in terms of frame duration. For example, the selection may identify when (in time intervals) the processor 108 causes transmission of the synchronization data after VSYNCH data is received from a selected camera 104.

In the manual mode, the receiver 102 is configured to identify a clock signal of a camera 104. The receiver 102 may be programmed (e.g., receive instructions as programmed by an operator) such that processor 108 is to cause transmission of the synchronization data to the cameras 104 in terms of picked (e.g., identified) camera 104 clock cycles. The receiver 102 may also be programmed with the desired frame duration. For example, an operator may program a selected frame duration such that cameras 104 transmit data packets within the selected frame duration.

Figure 2C:
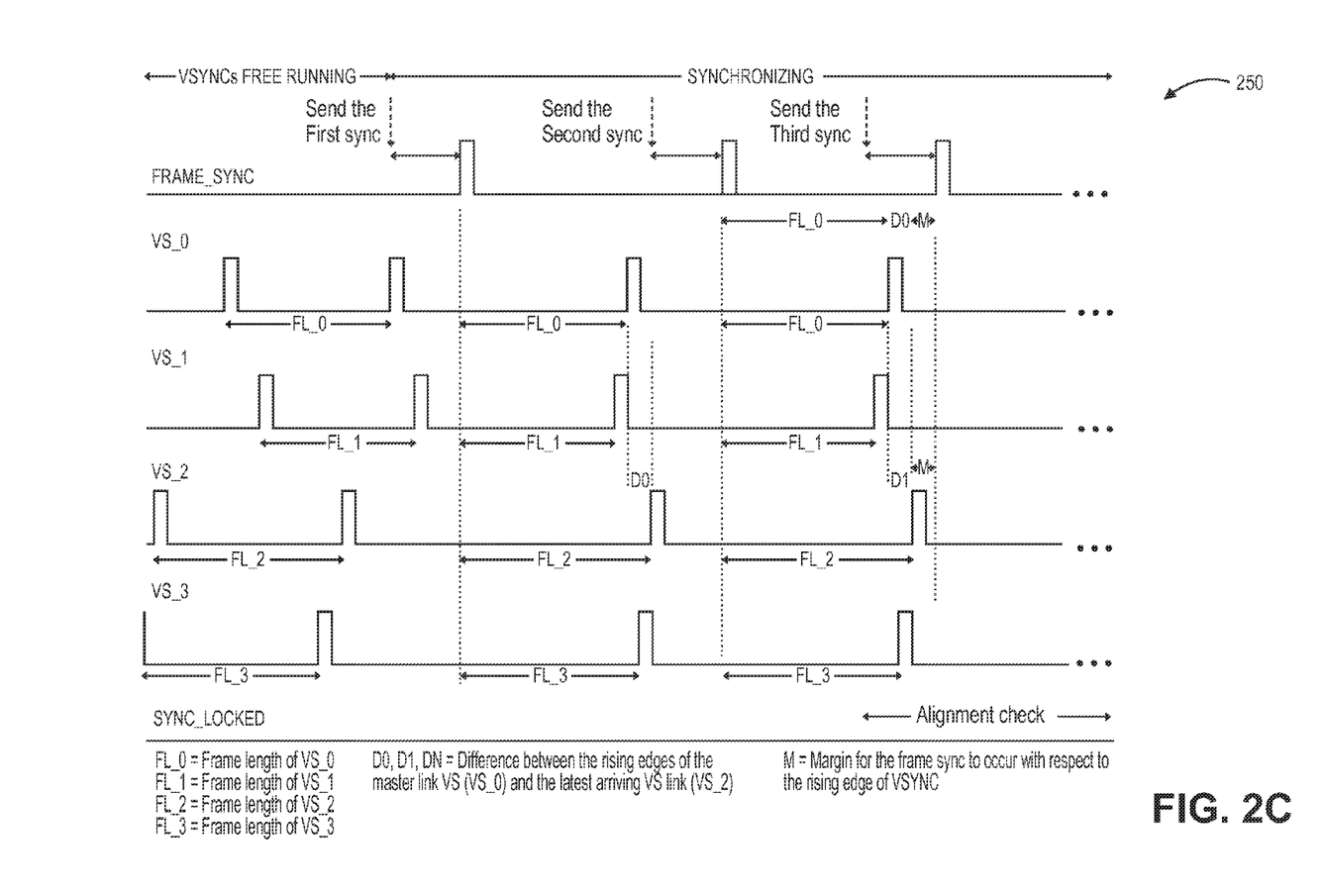
FIGS. 2C and 2D are example waveform diagrams for synchronizing data links in accordance with an example implementation of the present disclosure.
Figure 2D:
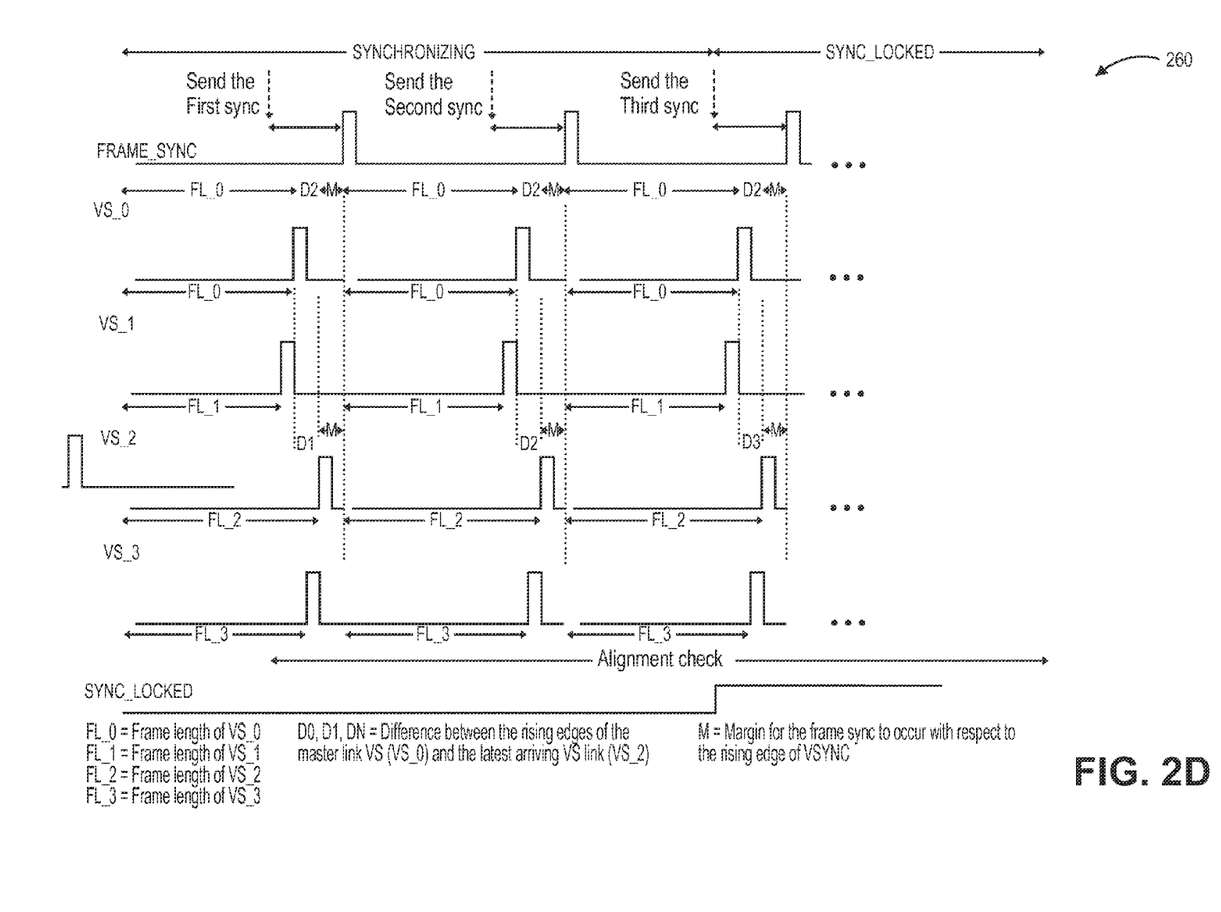

FIGS. 2C and 2D illustrate example waveform graphs 250, 260 in accordance with an example implementation of the present disclosure. In this implementation, the frame duration of the data links 106 is calculated automatically utilizing the VSYNC signals transmitted by the cameras 104. The cameras 104 may be transmitting the data frames automatically (e.g., even without the frame synchronization signal [i.e., synchronization data]) and the frame duration may be calculated automatically before the frame synchronization starts.

During operation, the cameras 104 are continuously transmitting data frames and, initially, the VSYNCH signals (VS_0 through VS_3) of each data link may be unsynchronized (e.g., free running) as illustrated in FIG. 2C. The frame length (FL) of the master link (e.g., the data frame that the synchronization signal [e.g., synchronization data] is based upon) may be counted in terms of pixel clock cycles until the receiver 102 receives VSYNCH signals from the enabled data links 106 before transmitting the first synchronization signal to the cameras 104.

After the processor 108 measures the frame length of the master link (e.g., VS_0 in this example) and determining that the data links are functional, the first synchronization signal is transmitted to the cameras 104 to align the VSYNC signals of the cameras 104. In some instances, the aligned VSYNC signals (e.g., VSYNC signals based upon the synchronization signals) may arrive at different times due to skew differences and parts per million (ppm) differences and so forth. The processor 108 calculates the difference between the master link (e.g., VS_0) and the slowest link (e.g., VS_2) in terms of the master pixel clock, which is illustrated as D0 in FIG. 2C. Master link refers to the communication between the receiver 102 and respective camera 104 (e.g., camera that that transmits the VSYNC signal for which the synchronization signal is based upon), and slowest link refers to the communication between the receiver 102 and respective camera 104 (e.g., the camera that transmits the VSYNC signal having the greatest time difference between its VSYNC signal and the master VSYNC signal). The slowest link may be defined as the VSYNCH signal that corresponds to a defined synchronization signal (e.g., first synchronization signal) having the greatest time difference with respect to the master link that corresponds to the defined synchronization signal (e.g., first synchronization signal). Based upon the difference, for example, the next frame synchronization signal are transmitted with a period of the master frame length plus the calculated difference. For example, the frame synchronization signals may be transmitted having a period of FL_0+D1, ..., DN+M, where D is the difference value added to the frame length of the master link to compensate for the slowest link and M is added to compensate for the frame to frame jitter in the data link 106.

The difference value (e.g., difference between the master link and the slowest link) may be updated each frame, which allows for the dynamic calculation of the slowest link duration among the data links communicating with the cameras 104 at each frame. FIG. 2D illustrates waveform graphs where the frame difference calculation checks are employed in accordance with an example implementation of the present disclosure. The alignment of the VSYNC signals may be checked continuously each frame (as shown in FIG. 2D). If the processor 108 determines that the VSYNCH signals from each camera 104 are aligned for N consecutive frames, the synchronization is locked (N is equal to 2 in FIG. 2D). After synchronization is locked, if there is misalignment in P consecutive frames, the system 100 may no longer be synchronized (where P can be a positive integer).

In the semi-automatic mode of operation, the worst case ppm difference may be calculated manually and reflected in the M value described above. In the manual mode of operation, the frame synchronization signal period may be generated manually. In some instances, the frame synchronization signal period may be greater than the frame duration of the cameras 104, as well as the skew differences and ppm differences. The cameras 104 may be in both continuous and/or pulse triggered modes as the manual mode of operation may not utilize the VSYNC signals in frame synchronization period generation.

Example Method

Figure 3:
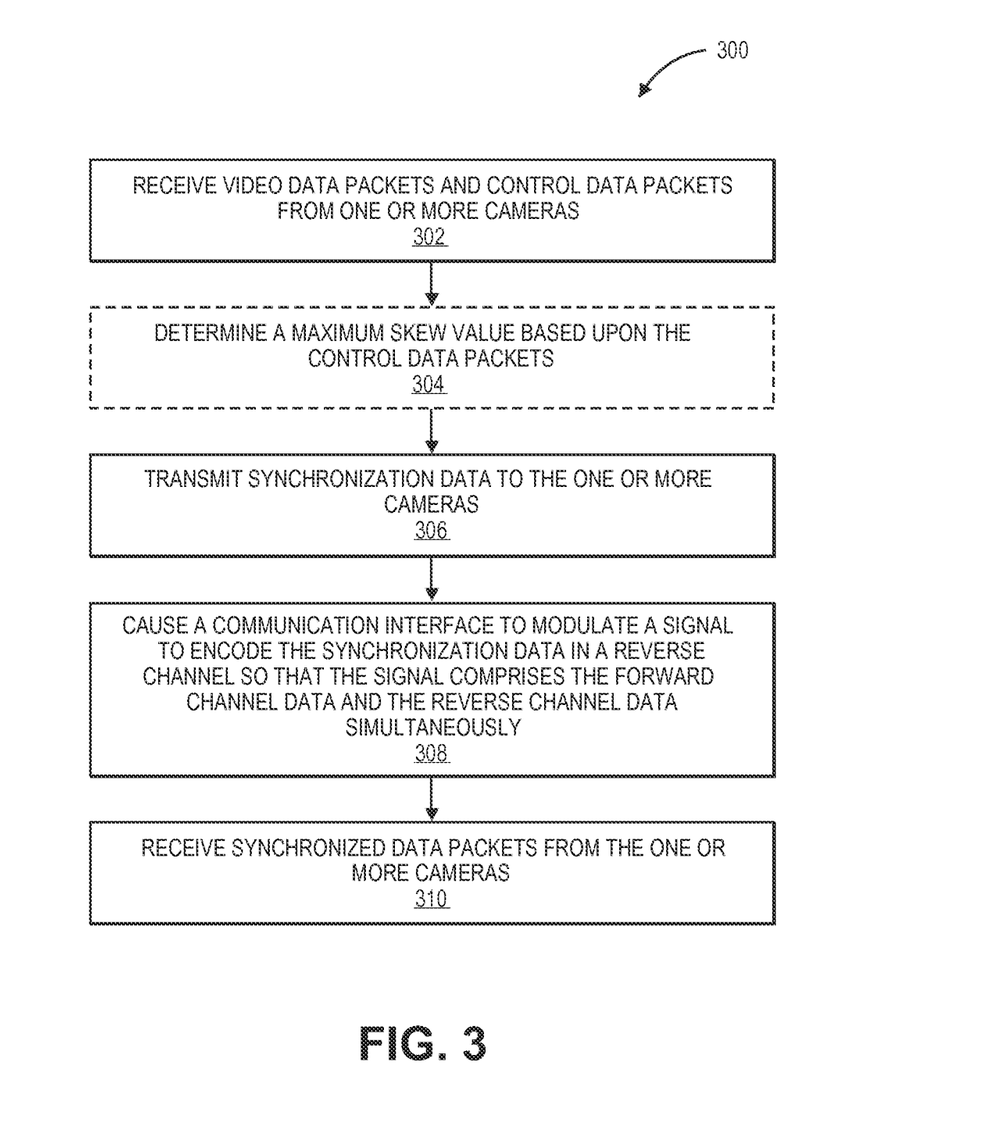
FIG. 3 is a method diagram for transferring data in accordance with an example implementation of the present disclosure.

FIG. 3 illustrates an example method 300 for operating a sensor system at least substantially plesiochronously. As shown, video data packets and control data packets are received from one or more cameras (Block 302). As described above, one or more cameras 104 transmit video data packets and control data packets to the receiver 102 over the data link 106. Respective communication interfaces 116, 118 convert (e.g., serialize/de-serialize) the data packets for communication purposes within the system 100. In some instances, the control data packets comprise frame and/or line synch signals (e.g., VSYNCH, HSYNCH) corresponding to each camera 104.

In some implementations, as shown in FIG. 3, a maximum skew value is determined based upon the control data packets (Block 304). As described above, the processor 108 determines the maximum skew associated with a camera 104 within the system 100 and/or the system 200. Based upon the maximum skew, the processor 108 generates a synchronization data. The processor 110 of the cameras 104 utilizes the synchronization data to determine which video frame packet to transmit to the receiver 102.

A synchronization data is transmitted to the cameras (Block 306). In one or more implementations, the processor 108 causes transmission of the synchronization data to the cameras 104. For example, the processor is configured to cause the communication interface to modulate a signal to encode the synchronization data in a reverse channel so that the signal comprises the forward channel data and the reverse channel data simultaneously (Block 308). In some implementations, the processor 108 causes transmission of the synchronization data upon determining a synchronization data based upon the maximum skew. In other implementations, the processor 108 causes transmission of the synchronization data at defined time intervals (e.g., internally counted frame duration). As shown in FIG. 3, synchronized video packets are received from the cameras (Block 310). The respective processors 110 of the cameras 104 utilize the synchronization data to determine which video data packets to transmit to the receiver 102. The video data packets may be video data packets that have been buffered in the memory 112. Upon receiving the synchronized video data packets, the processor 108 processes and/or re-formats the video data packets before causing transmission of the synchronized video data packets via the I/O channel 122. A display may then process the video data packets to cause display of synchronized video captured by the cameras 104.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
a plurality of cameras, each camera of the plurality of cameras configured to generate a signal for transmission via a single-ended communications link, the signal comprising data packets encoded in a forward channel; and
a receiver communicatively coupled to the plurality of cameras via the single-ended communications link, the receiver configured to generate a synchronization data based upon at least one of the data packets, the receiver configured to modulate the signal to encode the synchronization data in a reverse channel so that the signal comprises the forward channel data and the reverse channel data simultaneously,
wherein the receiver is configured to determine a maximum skew based upon the data packets, and wherein the receiver is configured to generate synchronization data based upon the maximum skew, the maximum skew associated with at least one camera of the plurality of cameras.

2. The system as recited in claim 1, wherein the forward channel data comprises relatively high speed serial data and relatively low speed serial data.

3. The system as recited in claim 2, wherein the relatively high speed serial data comprises video data and the relatively low speed serial data comprises control data associated with the video data.

4. The system as recited in claim 3, wherein the control data comprises at least one of frame signals, line synch signals, or both frame signals and line synch signals.

5. The system as recited in claim 2, wherein the reverse channel data comprises relatively low speed serial data.

6. The system as recited in claim 1, wherein the receiver is further configured to determine an internally counted frame duration time interval, wherein the receiver is configured to cause transmission of the synchronization data to the plurality of cameras via the single-ended communications link in the reverse channel at each internally counted frame duration time interval.

7. An apparatus comprising:
a receiver configured to communicatively couple to a plurality of cameras via a single-ended communications link, respective cameras of the plurality of cameras configured to generate a signal for transmission via a single-ended communications link, the signal comprising data packets encoded in a forward channel, the receiver configured to generate synchronization data based upon at least one of the data packets encoded in the forward channel, the receiver configured to modulate the signal to encode the synchronization data in a reverse channel so that the signal comprises the forward channel data and the reverse channel data simultaneously,
wherein the receiver is configured to determine a maximum skew based upon the data packets, and wherein the receiver is configured to generate synchronization data based upon the maximum skew, the maximum skew associated with at least one camera of the plurality of cameras.

8. The apparatus as recited in claim 7, wherein the forward channel data comprises relatively high speed serial data and relatively low speed serial data.

9. The apparatus as recited in claim 8, wherein the relatively high speed serial data comprises video data and the relatively low speed serial data comprises control data associated with the video data.

10. The apparatus as recited in claim 9, wherein the control data comprises at least one of frame signals, line synch signals, or both frame signals and line synch signals.

11. The apparatus as recited in claim 8, wherein the reverse channel data comprises relatively low speed serial data.

12. The apparatus as recited in claim 7, wherein the receiver is further configured to determine an internally counted frame duration time interval, wherein the receiver is configured to cause transmission of the synchronization data to the plurality of cameras via the single-ended communications link in the reverse channel at each internally counted frame duration time interval.

* * * * *